M. OCHOA.
CAMERA.
APPLICATION FILED AUG. 6, 1919.
1,377,916.
Patented May 10, 1921.
3 SHEETS—SHEET 3.
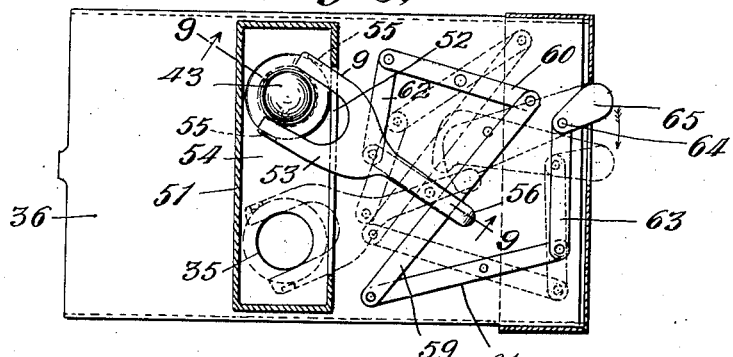
Fig: 6.
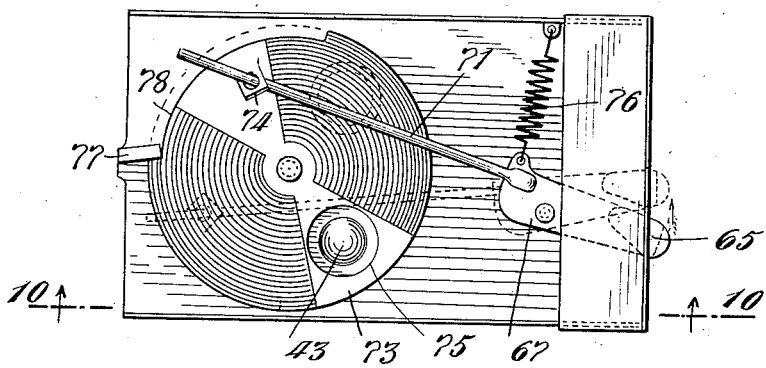
Fig: 7.
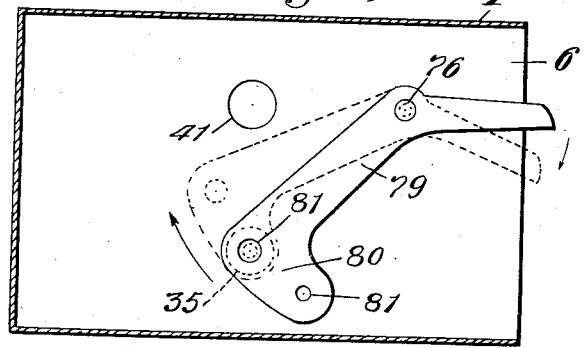
Fig: 8.
WITNESSES
E. A. Hagen
G. L. Kitchin
INVENTOR
Maria Ochoa,
BY
ATTORNEYS

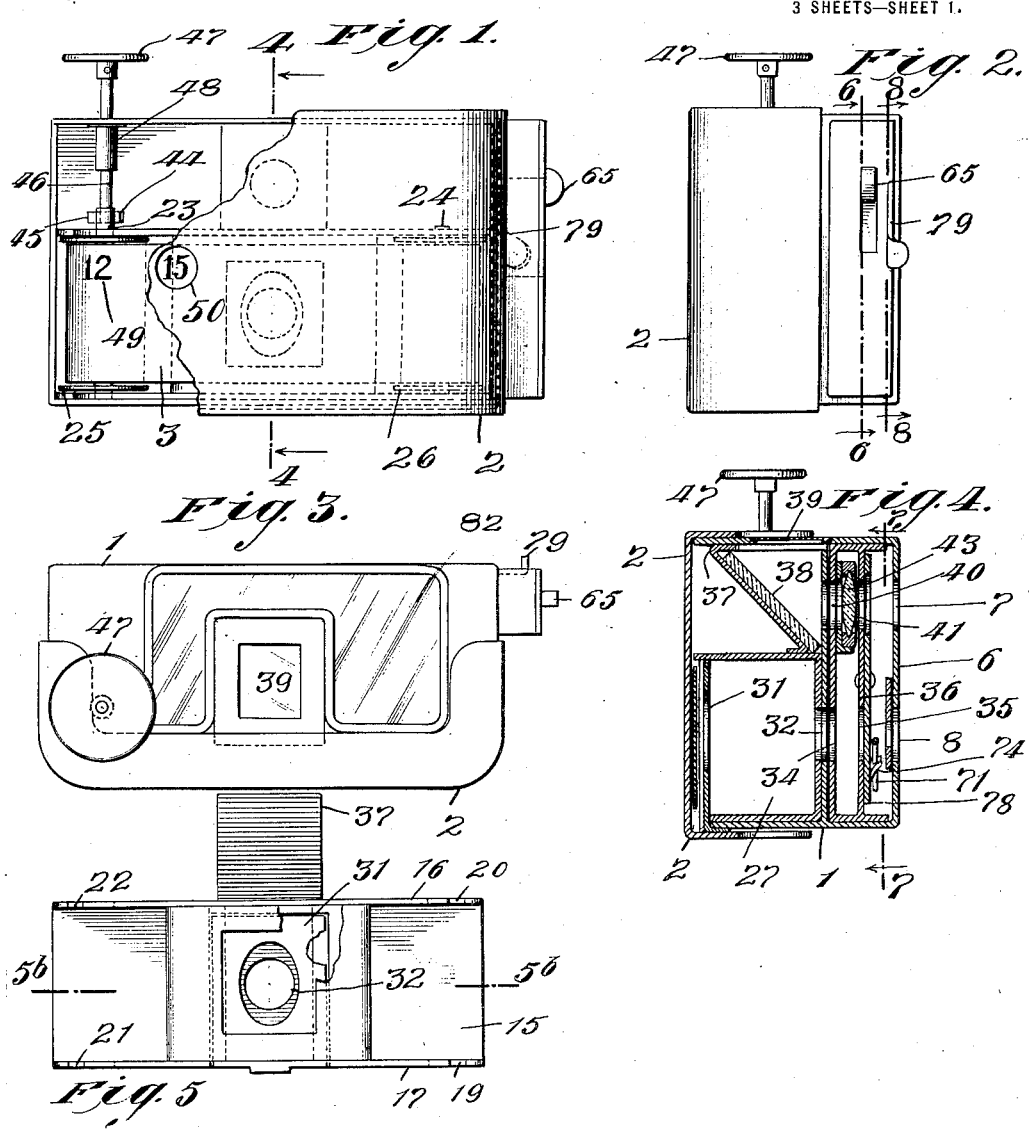

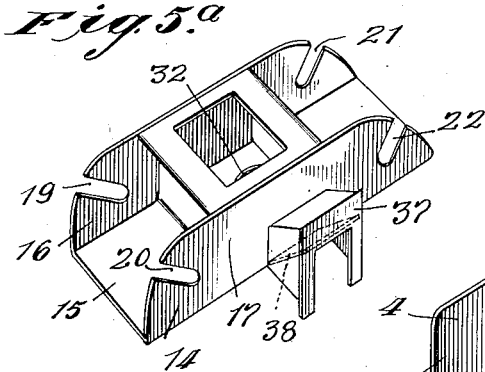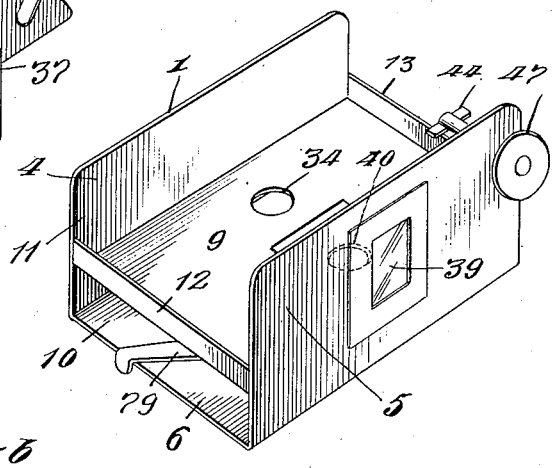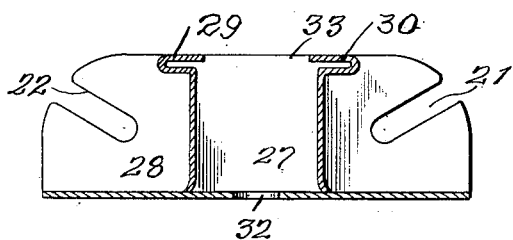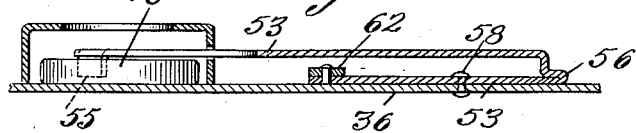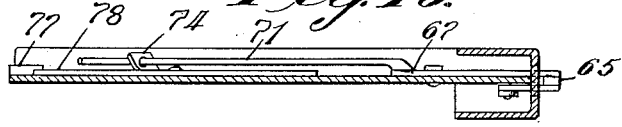

UNITED STATES PATENT OFFICE.

MARIA OCHOA, OF NEW YORK, N. Y.

CAMERA.

1,377,916.　　　　Specification of Letters Patent.　　Patented May 10, 1921.

Application filed August 6, 1919. Serial No. 315,694.

*To all whom it may concern:*

Be it known that I, MARIA OCHOA, a citizen of the Republic of Colombia, and a resident of the city of New York, borough of Manhattan, in the county and State of New York, have invented a new and useful Camera, of which the following is a full, clear, and exact description.

This invention relates to cameras and has for an object to provide an improved construction wherein a large number of exposures may be made while using a comparatively small construction.

Another object is to provide a construction wherein the same lens is used for the finder and for the main focusing lens.

A further object is to provide a camera which is small, compact and easily operated and which may be used openly or covertly in a hand bag or other covering article.

In the accompanying drawings:

Figure 1 is a front elevation of a camera embodying the invention, certain parts being broken away to better illustrate the construction.

Fig. 2 is an end view of the camera shown in Fig. 1.

Fig. 3 is a top plan view of the camera shown in Fig. 1.

Fig. 3ᴬ is a detail perspective view of the casing removed.

Fig. 4 is a transverse sectional view through Fig. 1 on line 4—4.

Fig. 5 is a plan view of the film holder and ground glass holder.

Fig. 5ᴬ is a detail perspective view of one end of the holder shown in Fig. 5.

Fig. 5ᴮ is a section through Fig. 5 on line 5ᴮ—5ᴮ.

Fig. 6 is a section through Fig. 2 on line 6—6.

Fig. 7 is a sectional view through Fig. 4 on line 7—7.

Fig. 8 is a sectional view through Fig. 2 on line 8—8.

Fig. 9 is a detail fragmentary sectional view through Fig. 6 on line 9—9.

Fig. 10 is a detail fragmentary sectional view through Fig. 7 on line 10—10.

Referring to the accompanying drawings by numerals 1 indicates a casing provided with a telescoping cover 2 adapted to fit over the sides and ends of the casing and thoroughly cover the film 3. The casing 1 is formed as clearly shown in Fig. 3ᴬ. It is provided with two upstanding side walls 4 and 5 merging into the front plate 6 having the finder opening 7 and the focusing lens opening 8. A division plate or partition 9 is connected to the sides 4 and 5 a short distance from the front plate 6 whereby a chamber 10 is formed which receives the lens, shutter and associated mechanism hereinafter fully described. The partition 9 is provided at one end with a low wall 12 and a wall 13 at the opposite end, the wall 13 closing one end of chamber 10 and projecting above partition 9 to a position substantially flush with the upper edge of wall 12. The film holder 14 (Fig. 5ᴬ) is fitted against the partition 9 with its ends snugly fitting against the walls 12 and 13 as shown in Figs. 1 and 4. This film holder consists of a base plate 15 formed with bent up sides 16 and 17 provided with slots 19, 20, 21 and 22 for receiving ends of the journal pins 23 and 24 of the respective film spools 25 and 26. A boxing or dark chamber 27 is provided on the holder 14 by positioning a bent up, substantially U-shaped member 28 on the partition 9 approximately centrally thereof. From Fig. 5ᴮ it will be noted that slide runways 29 and 30 are provided in member 28 for receiving a suitable picture framing slide 31. The base 15 of the holder 14 is provided with an opening 32 in line with the opening 33 and the opening 34 in the partition 9. The opening 34 is in line with the opening 35 in the shutter supporting plate 36 and the opening 8 in the front 6. The holder 14 is also provided with a hood 37 carrying a mirror 38 adapted to reflect the image on the ground glass 39. The mirror is set at a 45° angle to a line positioned normal to the ground glass 39 and also at a similar angle to a line passing centrally through openings 40, 41 and 7 in the partition 9, guide 42, plate 36 and front 6 whereby whenever the lens 43 is in back of opening 7 an image will be thrown on the glass 39. The film holder may be rigidly secured in place in any desired way, but is preferably made removable and held in place by friction. The journal pin 23 of spool 25 is hollow at one end and is also provided with oppositely positioned notches for receiving the wings 44 and 45 of the winding rod 46 when the end of the rod is inserted into the pin 23. The rod 46 is provided with a thumb member on its outer end and is slidingly mounted in a tubular guide 48 soldered or otherwise rigidly secured to the wall 5 of casing 1. By this arrangement, whenever an exposure is made the thumb member 47 is rotated, which in turn will rotate spool 25 for winding the film thereon until another number or legend 49 appears opposite window 50 provided in the telescoping cap 2. A different framing slide 31 may be used whenever desired, provided it is placed in position when the camera is empty or is in a dark room.

In order to provide for an image on the ground glass and to provide for a proper focus of the light entering the chamber 27 a single lens 43 is used. This lens arrangement is shown more particularly in Figs. 4 and 6. As shown in the drawings the lens 43 is guided in a back and forth movement by a guiding frame 51 which is rigidly secured in any desired manner to the plate 36, and provided with a slot 52 through which the actuating lever 53 extends. This lever is provided with a fork or bifurcation 54 having turned up lugs 55 engaging the sides of the lens for shifting the same, said lens sliding in the bifurcation in order to have a straight back and forth movement from adjacent the aperture 41 to adjacent the aperture 35. The lever 53 is bent back upon itself at 56 for forming a return section 57 through which the pivotal rivet or pin 58 extends, said pin or rivet fitting into plate 36. This arrangement is provided in order that the link 59 may be positioned as shown in Fig. 6, and pivotally connected at one end to a pivotally mounted lever 60 and the opposite end to a second pivotally mounted lever 61. Lever 60 has a link 62 pivotally connected thereto, which in turn is pivotally connected to the end of the section 57 of lever 53 so that when the lever 60 is swung in one direction the lever 53 will be moved to the dotted position shown in Fig. 6 and then moved back to the opposite position as shown in full lines in Fig. 6. Lever 61 has a link 63 pivotally connected therewith which in turn is pivotally connected at 64 to an actuating lever 65, which is rigidly secured at 66 to the outer end of lever 67 whereby both levers are practically one exteriorly of the end wall 68 of the plate 36. End wall 68 is provided with inwardly extending sections 69 and 70 designed to telescope into the chamber 10 so as to maintain a light-proof structure. By this construction, whenever the levers at connection 66 are moved both levers will be moved simultaneously so as to shift the lever 53 and the lens 43, at the same time swinging the arm 71 on the pivot 72 for shifting the position of the shutter 73. From Fig. 7 it will be seen that the arm 71 extends loosely through a pressed out portion 74 of shutter 73 whereby the shutter may be easily shifted in order to bring the window 75 thereof in line with the lens regardless of which extreme position it is occupying. A retractile spring 76 is connected with the lever 67 for returning the same and the shutter 73 to their former or normal position, with the window 75 opposite the opening 7 so that the finder may operate. The lens 43 is also normally opposite window or opening 7. A suitable stop 77 projects into the cutaway portion 78 of the shutter so as to limit its back and forth movement.

In order to vary the exposure opening a lever 79 is provided which is pivoted at 76 on to the front wall 5 of the casing 1 as shown in Fig. 8, said lever extending a short distance beyond the wall 5 at one end, and at the other end is provided with an enlargement 80 having a number of apertures 81 therein designed to be brought opposite the opening 8 at different times.

The plate 36 with the lens 43 and mechanism for operating the same, and the shutter 73 and mechanism for operating the same are all bodily removable, the same being frictionally held in the chamber 27. Also in forming the device a vanity mirror 82 is preferably positioned on the outer face of one of the sides adjacent the ground glass 39.

The camera may be used as an ordinary small camera and is preferably of less length than the width of an ordinary person's hand whereby a large number of small pictures may be taken, which if desired may be enlarged provided the lens 43 is a good lens. A first-class lens may be provided without unreasonably increasing the cost, because there is only one lens for the device, as the same lens acts as focusing lens and as a finder lens.

In some instances it may be desired to take pictures without being seen, and by reason of the smallness and the particular construction this may be readily done, as the camera may be covered by different means.

What I claim is:

1. In a camera of the character described, a frame, means for holding a film in the frame, a glass for receiving an image, a single lens coacting with said glass and with the film, a rectangular guide for the lens, said guide being formed with a slot, a lever mechanism having a part extending through said slot and engaging the lens for shifting the same from in front of said glass to in front of the film, and back again to its original position, and a shutter operated after said lens has reached the exposure position in front of said film.

2. In a camera of the character described a casing provided with a compartment back of the front face and with exposure and finder openings at the front, a film holder arranged in the rear of the casing, a covering for the rear of said casing, a lens, and manually actuated means connected with said lens for moving the lens to a position in line with said finder opening and said exposure opening at will, a shutter, and means for connecting the shutter with said manually actuated means whereby when said manually actuated means is moved the shutter will also be moved for covering either of said openings according to the direction of movement of said manually actuated means.

3. In a camera of the character described a casing provided with a pair of openings in the front part, means for supporting a film in the rear part of the casing opposite one of said openings, a reflector positioned back of the other of said openings and at an angle thereto, a ground glass for receiving an image from the reflector, a lens, means for shifting the lens from one opening to the other so that it will act at one time as a finder lens and at another time as a focusing lens, a shutter for the opening in front of said film and a substantially U-shaped manually actuated lever connected with said shutter and means for shifting the lens for operating the lens and shutter, said U-shaped lever being formed with a resilient member positioned to retard the movement of said shutter until the lens has reached the exposure position.

4. In a camera of the character described, a casing, means for carrying a roll of films at the rear of the casing, said casing having a finder opening and a focusing opening in the front wall, the focusing opening being opposite the means for carrying the film, said casing being formed with a pair of chambers between the front wall and the means for carrying the film, said chambers having a division wall therebetween formed with apertures registering with said finder and focusing openings, a lens, a lens supporting plate arranged in said chamber carrying said lens, said plate being formed with an end fitting into the end of the chamber so as to shut out the light, a guide for said plate, a yoke-shaped lever straddling the lens, a plurality of levers actuating the yoke-shaped lever for shifting the lens from in front of one of the openings in the front wall to the other opening, a U-shaped actuating lever straddling said division wall, part of the U-shaped lever extending beyond said wall so as to be manually actuated, a shutter arranged on the opposite side of said wall to the lens, and means for connecting the shutter with the U-shaped lever for causing the shutter to operate in proper timed relationship to the lens.

MARIA OCHOA.